(12) United States Patent
Rapport

(10) Patent No.: US 6,992,501 B2
(45) Date of Patent: Jan. 31, 2006

(54) REFLECTION-CONTROL SYSTEM AND METHOD

(75) Inventor: Russell Rapport, Austin, TX (US)

(73) Assignee: Staktek Group L.P., Austin, TX (US)

( * ) Notice: Subject to any disclaimer, the term of this patent is extended or adjusted under 35 U.S.C. 154(b) by 0 days.

(21) Appl. No.: 10/800,816

(22) Filed: Mar. 15, 2004

(65) Prior Publication Data

US 2005/0200380 A1 Sep. 15, 2005

(51) Int. Cl.
*H03K 19/003* (2006.01)

(52) U.S. Cl. .......................................... 326/30; 326/27
(58) Field of Classification Search .................. 326/30
See application file for complete search history.

(56) References Cited

U.S. PATENT DOCUMENTS

| | | | |
|---|---|---|---|
| 5,422,608 A | * | 6/1995 | Levesque .................... 333/17.3 |
| 6,424,175 B1 | * | 7/2002 | Vangal et al. .................. 326/82 |
| 6,741,095 B2 | * | 5/2004 | Abrosimov et al. ........... 326/30 |

* cited by examiner

*Primary Examiner*—James H. Cho
(74) *Attorney, Agent, or Firm*—Andrews Kurth LLP; J. Scott Denko

(57) ABSTRACT

A termination circuit changes impedance to match a transmission line impedance. The change is made after a signal driver applies a signal through the termination circuit to the transmission line but before a signal reflection returns from an end of the transmission line.

48 Claims, 6 Drawing Sheets

REFLECTION-CONTROL SYSTEM AND METHOD

TECHNICAL FIELD

The present invention relates to maintaining signal integrity on transmission lines and, in particular, to dampening transmission line reflections.

BACKGROUND OF THE INVENTION

Transmission line termination refers to strategies or systems used to cancel, mitigate, or dampen signal reflections on transmission lines. Appropriate termination techniques also mitigate other signal integrity problems such as "ringing" oscillations and signal delays. When electronic circuitry employs high-speed components such as fast microprocessors, for example, it is particularly helpful to include proper termination impedance-matching strategies in signal transmission line designs.

As the speed of digital circuits increases, a number of characteristics related to signal integrity and transmission line behavior deteriorate. It can be expected, for example, that as clock rates rise, crosstalk, the unintended influence of a line's electromagnetic field on other signals, increases. For example, when the clock rate of a system doubles, crosstalk tends to double. Further, as signal speeds increase, electromagnetic noise increases, thus affecting signal integrity. Adding an increased number of power and ground connections and more bypass capacitors to shunt electromagnetic noise may help mitigate these effects. At some point, however, new strategies to minimize transmission line reflections and crosstalk will be needed to preserve signal integrity.

At today's speeds, even the passive elements of a high-speed design, features such as the wires and printed circuit board (PCB) traces, for example, as well as chip packages, can contribute significantly to overall signal delay and exacerbate timing and logic errors. The secular move toward ever-increasing speeds without commensurate improvements in transmission line signal management and termination will make signal integrity preservation an escalating issue in high speed electronics.

Driver characteristics may be modified to improve signal integrity. Lower output impedance drivers tend to drive heavily loaded signals more quickly. Drivers with controlled variation in output impedance from cycle to cycle also tend to improve transmission line impedance matching thus inhibiting reflection behavior. Lower transmission line impedances and lower driver output impedances typically result, however, in higher power consumption as lower impedances dissipate more power.

Signal integrity management strategies typically include appropriate termination structures devised to inhibit signal reflections that arise on the transmission line. Unfortunately, termination structures occupy space and dissipate power. Designers in the art, therefore, sometimes avoid adding physical termination structures to board designs.

Two principle techniques are employed in termination structures: source (series) termination and load (parallel) termination. Source or series termination places an impedance (many times a simple resistor) between the signal driver and the transmission line. Load or parallel termination places an impedance parallel with the receiver or load at terminal point of the transmission line. Sometimes the two methods are combined.

Because source impedance is typically more predictable than load impedance, a series termination impedance typically better matches the impedance of a transmission line than does the impedance of a parallel termination scheme. Further, because a series termination, unlike a parallel termination, does not typically consume appreciable power after the line is driven HIGH, a series termination often consumes less power than does a parallel termination. Series terminations typically present, however, a relatively high series impedance that can impede signal integrity by increasing the transmission line RC characteristic.

The basic termination schemes are often seen in a variety of modified forms. One technique adjusts, for example, an on-chip variable parallel termination to match a reference resistor. The on-chip termination is typically a network of parallel resistors controlled by series switches and a feedback circuit. This scheme uses little PCB space but, like many parallel termination schemes, can dissipate power even after the transmission line has been driven HIGH. One example of such a technique is purportedly depicted in U.S. Pat. No. 6,605,958 to Bergman, et al. It also can be difficult to terminate a complex topology like a DRAM address net.

Other techniques have been developed for matching transmission line impedance. One such scheme employs an adaptive transmission line termination including a linearly-variable resistor connected either in series with the sending end of a transmission line or, in parallel with the receiving end of the line. A feedback circuit varies the resistance to constantly match line impedance. This scheme attempts to mitigate cycle-to-cycle variance in transmission line and driver output impedances. When in series mode, this termination does not switch to a lower impedance when the line is driven HIGH and, consequently, does not mitigate the RC effect of the higher impedance that is often characteristic of series termination strategies. An example of this scheme is purportedly depicted in U.S. Pat. No. 5,422,608 to Levesque.

U.S. Pat. No. 6,265,893 to Bates depicts a system in which drivers are coupled to different points on a transmission line. The drivers each include a transistor in series with a resistance that matches the transmission line impedance. The transistor at one driver is ON to provide a load end parallel termination whenever another driver might be active. This system and many others like it, allow multiple devices to drive signals on the same transmission line, but they still exhibit problems inherent to parallel termination schemes such as higher power consumption and imprecise impedance matching, for example.

In any of the known termination schemes, when no load termination is used, the input impedance of the receiver is present at the load end of the transmission line. This impedance is typically a complex value with capacitive and resistive components. Because the typical receiver input resistance is higher than the transmission line impedance, the mismatch induces a reflection. This reflection wave or impulse can travel with an uncontrolled characteristic on the transmission line and impede or, in some cases, prevent accurate signal reception.

What is needed, therefore, is a technique and system for terminating a transmission line to reduce reflections, improve signal integrity, and drive the line HIGH quickly while presenting lower impedances and consuming minimal PCB space.

SUMMARY OF THE INVENTION

A transmission line is terminated with a series termination circuit that changes impedance in relation to the timing of applied signals. The impedance of the series termination circuit changes from a short circuit (or near short) to a matched impedance after substantial energy of an applied signal passes through the series termination circuit to the transmission line but before an initial signal reflection returns from a load end of the transmission line.

In a preferred embodiment of the invention, the system includes a series termination that substantially matches the transmission line impedance and a switch connected in parallel to the series termination. The switch closes before the transition of an applied signal. After the signal is applied through the closed switch but before an initial reflection arrives back at the driver site of the transmission line, the switch opens, placing the series termination between the driver and the transmission line.

DETAILED DESCRIPTION OF PREFERRED EMBODIMENT

Figure 1:
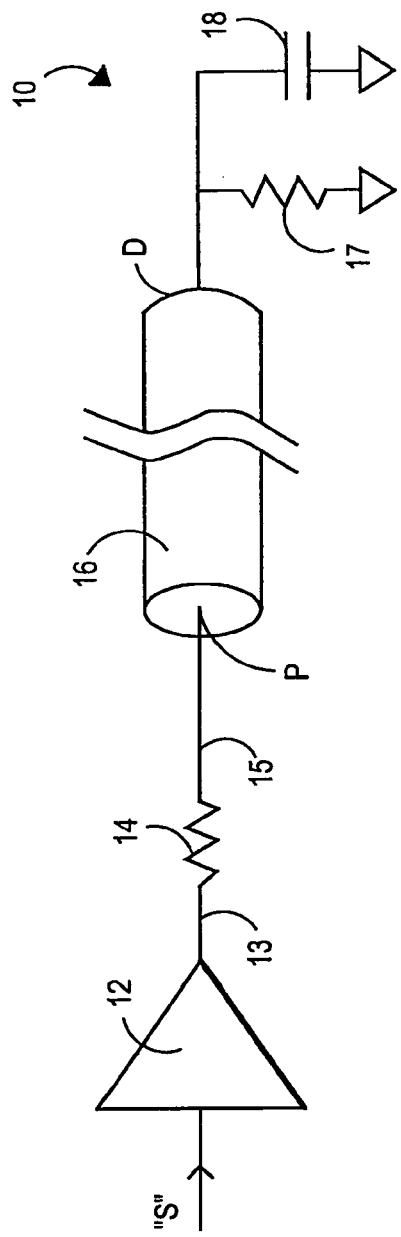
FIG. 1 depicts a prior art circuit illustrating series and parallel termination schemes.

FIG. 1 depicts a prior art circuit illustrating examples of series and parallel termination schemes. As shown in FIG. 1, basic driver 12 receives a signal "S" to be transmitted. Basic driver 12 typically transmits signal "S" from its output by applying digital HIGH and LOW signals, which typically have rising edges and falling edges during transitions between HIGH and LOW values. Basic driver 12 may be any of a variety of drivers including, for example, a Gunning Transistor Logic (GTL) style driver, a tri-state driver, or a complementary pair driver. These are just examples and those of skill in the art will recognize that the principles described here are applicable to a wide variety of driving circuits and conductive elements and media that exhibit transmission line behavior in the conveyance of energy.

Basic driver 12 is connected to a first terminal 13 of the series termination 14. Series termination 14 is also known as a "source termination" and may be referred to as either a source or series termination.

Although illustrated for ease of depiction as a resistance element, those of skill will recognize that in many circuits, series termination 14 is a complex impedance, that is, it exhibits capacitance and inductance. Series termination 14 may also be an active component or a combination of active components, such as, for example, a transistor with a controlled input voltage to present a characteristic impedance useful in source termination. Series termination 14 is preferably devised to present an impedance that matches the impedance of transmission line 16 to cancel or dampen signal reflections that may arise in system 10.

The second terminal 15 of series termination 14 is connected to the proximal end "P" of transmission line 16. Transmission line 16 is devised to convey electrical signals from basic driver 12 to one or more receivers. Transmission line 16 is typically a PCB trace, but may take many forms including, for example, coaxial cable, wires, wire pairs, ribbon cables, back-plane PCB traces and connectors, optical fibers, waveguides or dielectric slabs, or combinations of these and other signal lines known in the art. As is well-known, other circuit elements may exhibit electromagnetic field and propagation effects (such as mutual inductance, capacitance, and reflections) of a theoretical transmission line and although the invention may be used profitably with transmission lines 16 that exhibit classic transmission line behavior, the use of the invention is not limited to those systems where transmission line 16 meets that definition but may be used to advantage in the wide variety of types, lengths, and sizes of media used to convey energy. Further, other elements, such as, for example, on-die signal paths, pins of packaged integrated circuits, connectors, stacking connectors, and other elements known in the art may be considered as being part of transmission line 16 exemplified in the Figures herein. Transmission line 16 is shown as being broken with separating lines to indicate that it may have significant length. Transmission line 16 may further include several "ends" that branch out and/or terminate at several different locales or sub-circuits. Transmission line 16 is depicted with only one distal end "D", but as those of skill will recognize, it may have many distal ends.

Distal end "D" of transmission line 16 is connected to the receiver load 18, which is shown as being connected in parallel with a parallel termination 17. The depicted parallel termination 17 may appear on a transmission line with or without an accompanying series termination 14. It is well known to those of skill in the art that termination 17 may include a complex impedance or active elements such as transistors, for example. In any case, termination 17 is preferably devised to match the impedance of receiver load 18 to the impedance of transmission line 16.

Receiver load 18 is represented in FIG. 1 by a capacitive circuit to depict the capacitive characteristics which are typically quite relevant to signal integrity. Receiver load 18 may also, in this specification, be referred to as "receiver 18" or "load 18", however, those of skill in the art will recognize that the depiction of load 18 as a capacitive feature is a heuristic simplification of more complex phenomena and structure. Receiver 18 is the reception point for signals conveyed by transmission line 16 and, in practice, receiver 18 typically passes received signals to other circuits "downstream" from receiver 18. Such other circuits are not shown in FIG. 1 to simplify the illustration. Most receivers have a high input resistance which is not represented as a separate circuit element because high input resistances do not typically introduce large or significant errors into the operation of the circuit. However, the capacitance of load 18 affects the resistive/capacitive time constant of the circuit and is, therefore, symbolically depicted.

Figure 2:
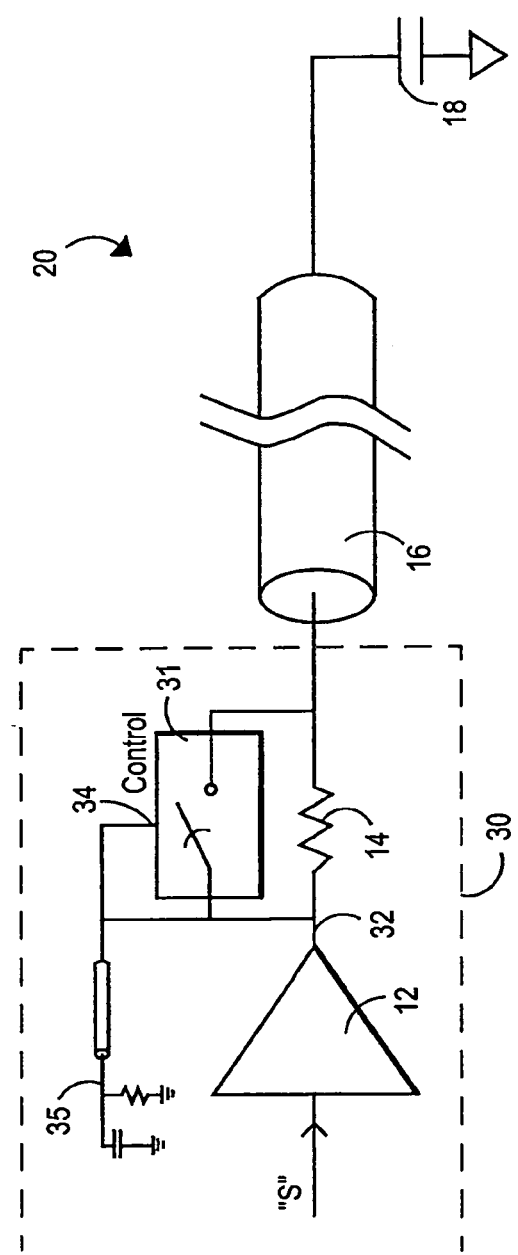
FIG. 2 is a symbolic depiction of a preferred embodiment of the invention.

FIG. 2 illustrates in system 20 a preferred embodiment of the present invention devised to inhibit deleterious reflections. System 20 includes reflection control driver 30, transmission line 16 and load 18. Those of skill will recognize that transmission line 16 and load 18 are idealized representations and may include complex topologies and behavioral attributes arising from multiple taps and branches, in the case of transmission line 16, for example, and, complex inductive behavior in the case of load 18, for example.

Reflection control driver 30 includes basic driver 12, switch 31, and series termination 14. Basic driver 12 can be any type of driver known in the art. Preferably, basic driver 12 has an output impedance of less than 2 ohms. As those of skill in the art will understand, basic driver 12 is presented with signal S to be conveyed on transmission line 16. Basic driver 12 conditions signal S for conveyance on transmission line 16 and presents a conditioned signal at output 32. The conditioned signals are typically binary signals that have HIGH and LOW voltages representing binary 1's and 0's. These signals must pass through switch 31 and/or termination 14 to reach transmission line 16 and receiver 18. Preferably, in an integrated semiconductor implementation of the depicted embodiment, switch 31 and termination 14 are located on-die, near basic driver 12.

Termination 14 is connected in series between driver output 32 and the proximal end P of transmission line 16. Termination 14 may be any type of termination known in the art, including, but not limited to, those discussed with regard to FIG. 1. Switch 31 is connected in parallel to termination 14 such that when switch 31 is closed, a signal can propagate from driver output 32 through switch 31 to transmission line 16. Switch 31 has a control terminal 34 which receives control signals and causes switch 31 to close or open in response thereto. Preferably, control terminal 34 is a binary type input terminal. In this preferred embodiment, control terminal 34 is connected to driver output 32, although those of skill will recognize that control terminal 34 may be controlled by any of a variety of well known timing and control schemes including passive and active techniques.

In a preferred embodiment, control terminal 34 operates to open switch 31 some predictable delay period after basic driver 12 applies a rising-edged signal to control terminal 34. Consequently, the rising-edged signal passes through closed switch 31 to proximal end P of transmission line 16. Consequently, substantially all of the impulse of the rising-edged signal propagates through closed switch 31 rather than termination 14. When the rising-edged signal travels through transmission line 16 and reaches receiver 18, a reflection is precipitated by the impedance mis-match between receiver 18 and transmission line 16. When the reflection returns to proximal end P of transmission line 16, the delay period between the application of the rising-edged control signal upon control terminal 34 and the consequent opening of switch 31 has passed. Consequently, with switch 31 opened, the reflection is diverted to pass through termination 14. Termination 14, chosen to match the impedance of reflection control driver 30 to the impedance of transmission line 16 dampens the return reflection.

Although a rising-edged signal has been introduced, those of skill in the art will realize after appreciating this specification that a variety of signaling schemes having a variety of signal transitions producing reflection wave-fronts can be effectively managed using the invention. With a transmitting scheme that uses negative voltage levels or more than two voltage levels, for example, the invention may be used to advantage at each signal transition which produces, in that particular signaling scheme, a reflection. The desired delay time of switch 31 and the related timing exhibited by the signal reflection on transmission line 16 will be further described with reference to FIG. 6.

Switch 31 is preferably a high-speed FET switch, but may be any switch fast enough to open and close within the needed timing parameters, a few examples of which are described with reference to FIG. 6. For example, switch 31 may be implemented with a single transistor or a combination of transistors or other electronic switches known in the art. The delay time of switch 31 may be managed with several possible sources. For example, switch 31 may be chosen so that its inherent switching time matches the desired delay. Other strategies may use a delay element 35 placed to delay the input to control terminal 34 as shown in FIG. 2 as another alternative in delay timing management. If such a delay element 35 is used, it is chosen, preferably, to add to the switching delay of switch 31 to produce the desired delay. Delay element 35 may be implemented by connecting an external element, such as a capacitor, resistor, or length of PCB trace.

Switch 31 maybe closed, however, any time between dampening of a signal reflection and application of the next transitioning-edged signal from basic driver 12. In preferred applications, switch 31 is closed upon application of a rising-edged signal at control terminal 34 and opens a related delay time later.

Figure 3:
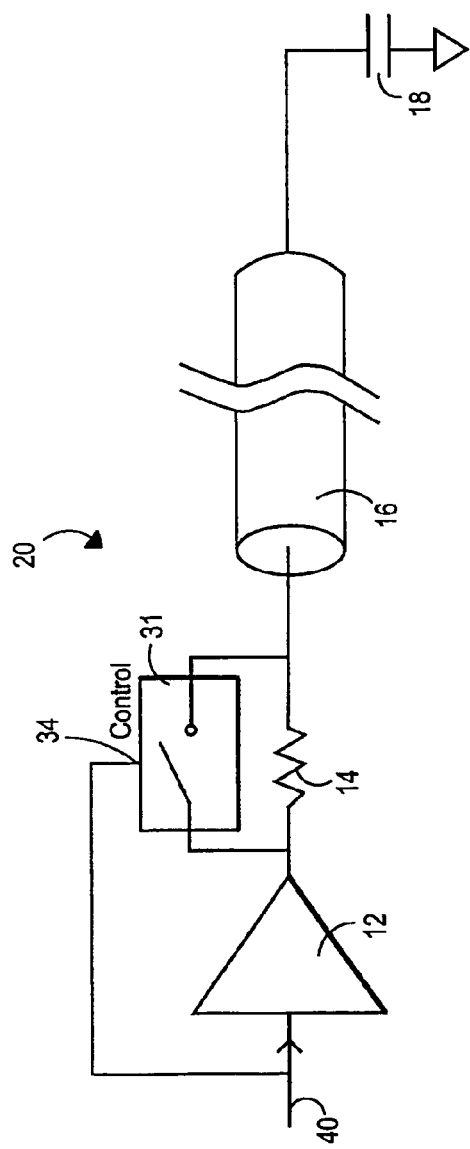
FIG. 3 is an alternative symbolic depiction of an alternative embodiment of the invention.

FIG. 3 depicts an alternative embodiment of the present invention. Control terminal 34 is connected to the driver input 40 of basic driver 12 rather than to the output. The embodiment of FIG. 3 may be used when switch 31 is too slow to close in time to dampen the signal reflection. Such an embodiment can deliver a control signal to switch 31 faster than embodiments such as that shown in FIG. 2 because delay in the driver is eliminated. Again, a time delay element may be added to switch 31 if switch 31 closes before the applied rising-edged signal passes through switch 31.

Figure 4:
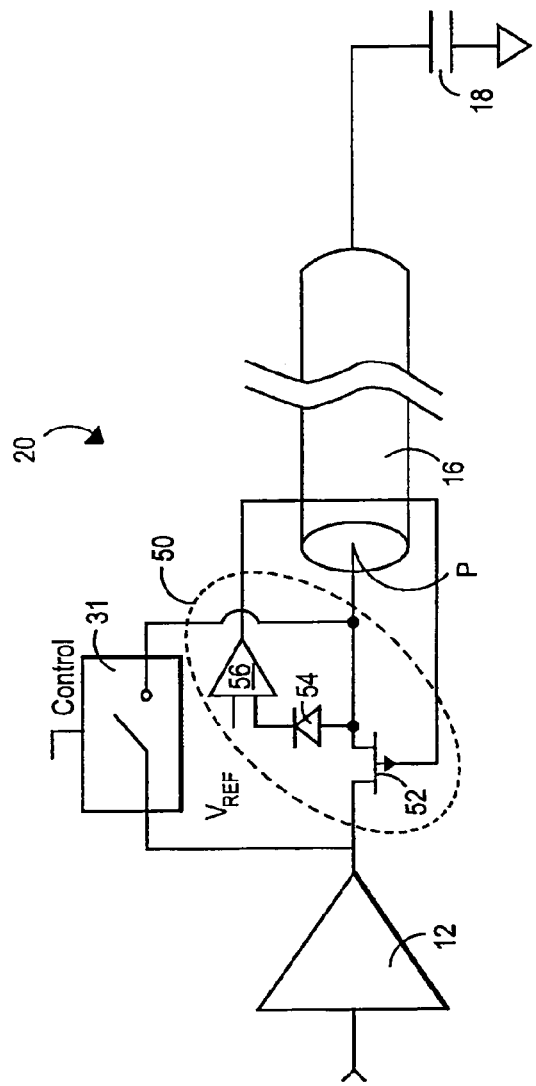
FIG. 4 depicts a further alternative embodiment of the invention.

FIG. 4 depicts another embodiment of the present invention devised to modify and improve alternative series termination schemes. As shown, a series termination is devised with an active termination 50 which, in the depicted embodiment, is a variable resistance. The variable resistance adjusts to impedance changes in transmission line 16 or basic driver 12. There are many ways known in the art to make a variable resistance, and the embodiment depicted here is merely one example that may be employed to advantage in the present invention. Active termination 50 is connected in parallel with switch 31. The control terminal of switch 31 may be operated as discussed with reference to earlier FIG. 2 or FIG. 3.

Active termination 50 includes a field effect transistor (FET) 52 connected between the output of basic driver 12 and the proximal end P of transmission line 16. The source terminal of FET 52 is connected through diode 54 to one input of amplifier 56. The other input of amplifier 56 is connected to a reference voltage, VREF, which is typically half of VDD (the voltage representing a high digital signal). The output of amplifier 56 is connected as a feedback to the gate of FET 52. The feedback adjusts the drain-to-source resistance of FET 52 to match the basic driver 12 output impedance to the impedance of transmission line 16; thus keeping the voltage on proximal end P of transmission line 16 close to VREF when switch 31 is open.

Figure 5:
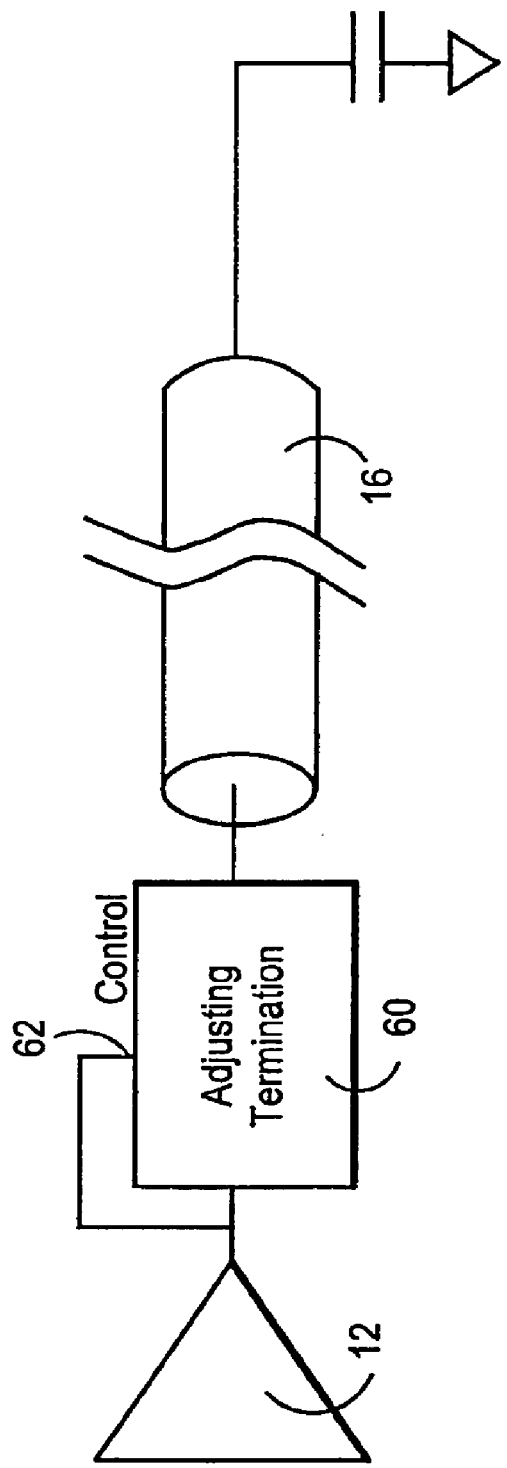
FIG. 5 depicts another embodiment of the invention.

FIG. 5 depicts another alternative embodiment of the present invention. An adjusting termination 60 is shown connected between basic driver 12 and transmission line 16. Adjusting termination 60 has a control terminal 62. In response to input signals, control terminal 62 causes adjusting termination 60 to change from a zero or near zero impedance to an impedance that matches or is close to that of transmission line 16. Those skilled in the art will recognize that many variable resistance circuits may be employed as depicted in the disclosed embodiment. In this embodiment, control terminal 62 is connected to the output of basic driver 12. However, control terminal 62 could be connected to the input of basic driver 12. Adjusting termination 60 exhibits a time delay between the application of an appropriate signal to control terminal 62 and the change to a matching impedance. The time delay is preferably no greater than twice the propagation delay of the transmission line.

Figure 6:
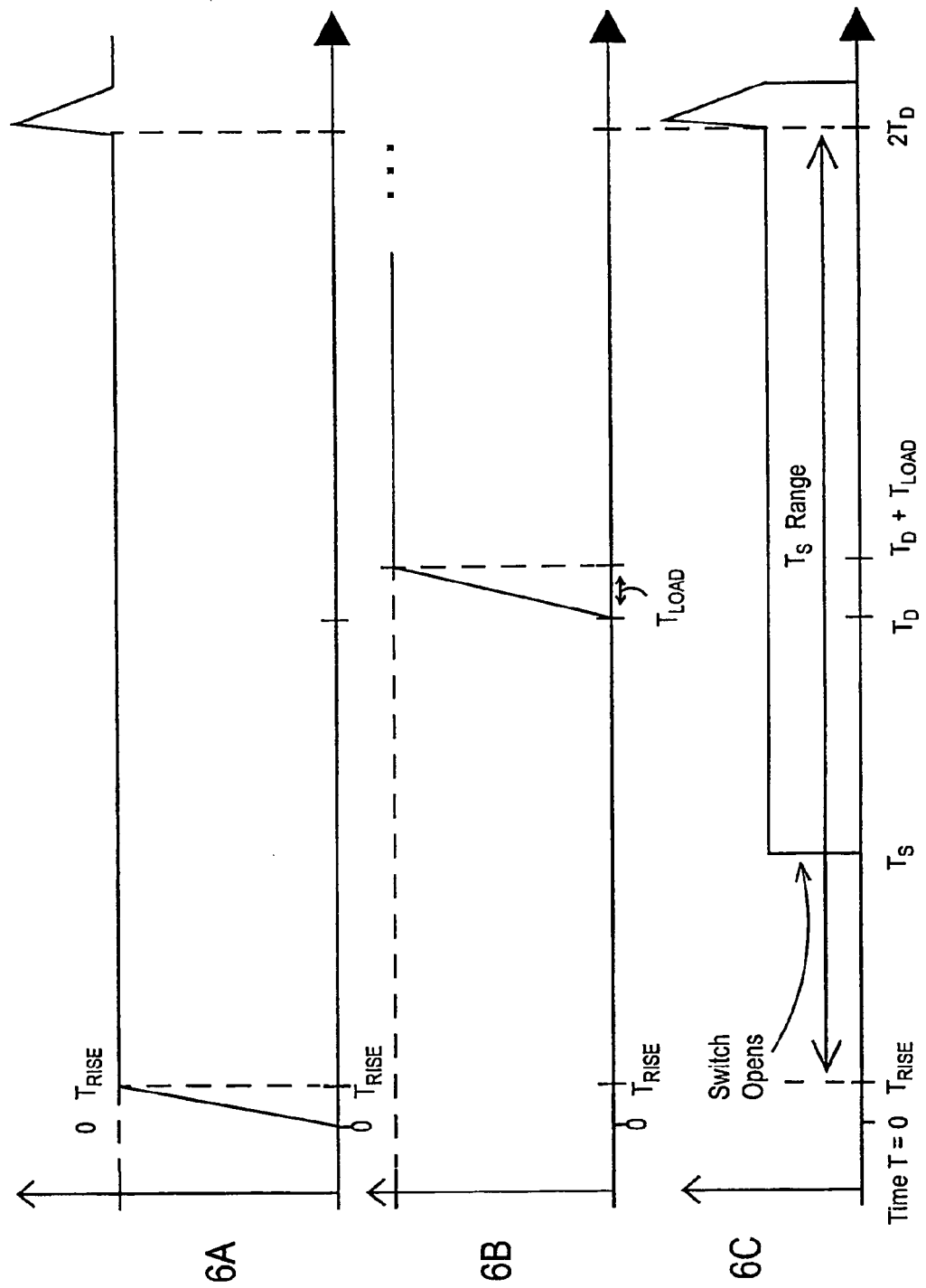
FIG. 6 is a timing diagram illustrating signals and events related to one embodiment of the invention.

FIG. 6 is a timing diagram depicting the propagation of signal voltages on the circuit of FIG. 2 and selected other embodiments of the present invention. Waveform 6A represents the voltage appearing between basic driver 12 and series termination 14. Waveform 6B represents the voltage appearing at receiver load 18. Waveform 6C represents the current through series termination 14.

All of the waveforms are on the same timescale, with time on the horizontal axis. Time T=0 is the time that basic driver 12 starts to apply a signal. Time "$T_D$" represents the propagation delay of transmission line 16. That is, the time it takes for a voltage signal to propagate the length of transmission line 16. Time $2T_D$ is the time it takes for a signal to propagate along transmission line 16 added to the time it takes for a reflection to propagate back from the load to reach the driver.

With reference to waveform 6A, at time T=0, basic driver 12 applies the rising-edged signal. Time $T_{RISE}$ is the rise time of the rising-edged signal. Rise times for different drivers vary greatly, but some fast drivers might have rise times of 0.05 nS to 0.4 nS or lower. The applied rising-edged signal propagates along transmission line 16 until it reaches distal end D. The voltage at D is shown in waveform 6B. This waveform shows a rise time $T_{LOAD}$ that is greater than $T_{RISE}$ because transmission line 16 and load 18 absorb energy and disperse the signal. The magnitude of waveform 6B is typically larger than that of 6A because load 18 precipitates an additive reflection that travels back toward control basic driver 30.

Waveform 6C represents the current through series termination 14. No current flows through termination 14 until time $T_S$, when switch 31 opens. Until switch 31 opens, all or most of the current flows through switch 31 instead of series termination 14. When switch 31 opens, all or most of the current flows through termination 14.

The reflection from load 18 causes a spike of current shown on waveform 6C shown at time $2T_D$ and a spike of voltage shown on waveform 6A at time $2T_D$. After the spike shown on waveform 6C, the current through series termination 14 typically drops to near zero amps because load 18 typically has a high input impedance and draws minimal current.

Waveform 6C is marked with arrows "$T_S$ Range" indicating a range of exemplar times where $T_S$ may be found, i.e., the time when switch 31 opens. Switch 31 preferably opens after time $T_{RISE}$ and before time $2T_D$. However, the switch could open before the rise time is complete if a substantial amount of the energy needed to drive the loaded transmission line HIGH were already applied to the transmission line. Time $T_S$ is preferably somewhere near one-half of the total of $T_D+T_{LOAD}$. Further, time $T_S$ may be chosen in accordance with one embodiment of the invention with equation 1.

$$T_S = \frac{\Pi}{e} SquareRoot(((RC)^2 + T_{RISE}^2)/2), \quad (1)$$

where RC is the resistive-capacitive time constant of the entire transmission line circuit, including load 18. RC is calculated as an equivalent RC with switch 31 closed. This equation may yield favorable results for practicing embodiments of the invention even when R, C, and $T_{RISE}$ vary greatly.

Figure 7:
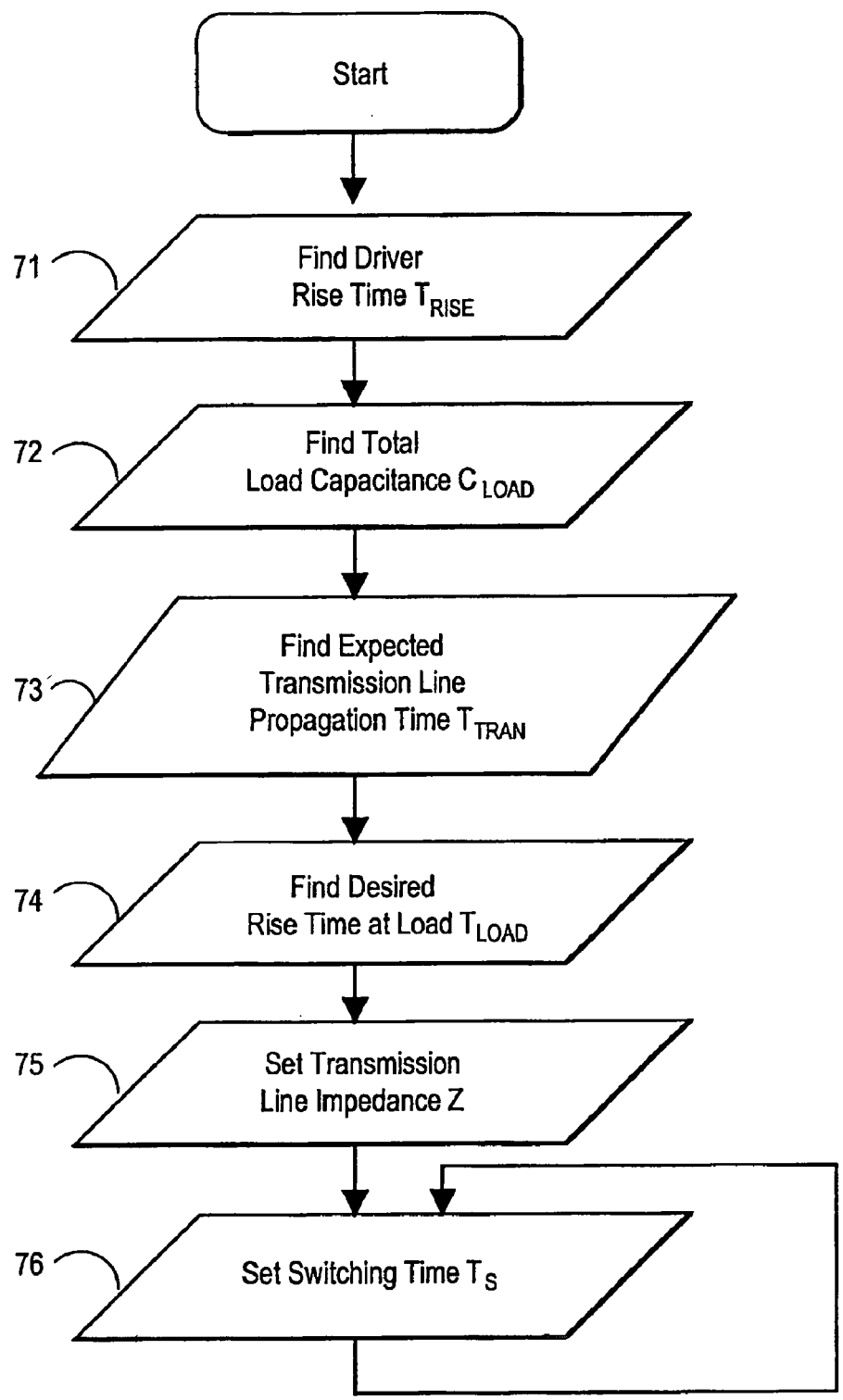
FIG. 7 is a flow chart of a procedure for configuring certain embodiments of the present invention.

FIG. 7 is a flow chart of a procedure for configuring certain embodiments of the present invention. This procedure may yield favorable results for practicing the invention for a point to point or star transmission line topology driving a heavy load.

Step 71 determines the basic driver 12 (FIGS. 2–5) rise time $T_{RISE}$ in a "no load" condition. Step 72 determines the total load capacitance $C_{LOAD}$. One or more receivers connected to transmission line 14 in a point-to-point or star configuration may be added to calculate $C_{LOAD}$, excluding the transmission line 14 capacitance. Step 73 determines the expected transmission line propagation time, $T_{TRAN}$. Desired part placement and signal propagation delay per unit length of transmission line largely determine $T_{TRAN}$.

Step 74 determines the desired rise time at the load, $T_{LOAD}$. Certain embodiments of the invention may yield more favorable results when $T_{LOAD}$ is less than the round trip delay time $2*T_{TRAN}$ of transmission line 14. Step 75 sets the impedance Z of the transmission line based on $C_{LOAD}$ and $T_{LOAD}$. Impedance Z may be determined in accordance with equation 2.

$$Z=\text{sqrt}(2)*T_{LOAD}/C_{LOAD} \quad (2)$$

Equation 2 may be modified to include a correction factor devised to adjust for unloaded rise time $T_{RISE}$. For operating environments with high load capacitances $C_{LOAD}$ and short values of $T_{LOAD}$, equation 2 may result in values of impedance Z that are low compared to the lowest values achievable with a particular transmission line or trace technology. Two or more relatively high impedance transmission lines or traces may be employed in parallel to achieve these low impedance Z values. Alternatively, load capacitance $C_{LOAD}$ could be reduced or a longer rise time $T_{LOAD}$ could be chosen by working backwards from the lowest practical impedance Z in a particular operating environment to determine the charge needed on $C_{LOAD}$.

With continued reference to FIG. 7, step 76 determines the switching time $T_S$. Switching time $T_S$, described with regard to above-referenced FIG. 6, is the time at which series termination 14 impedance changes to match the transmission line impedance. $T_S$ may, in this alternative embodiment of the invention, be approximately determined in accordance with equation 3.

$$T_S=Z*C_{LOAD}/\text{sqrt}(2) \quad (3)$$

Switching time $T_S$ may be implemented in a variety of ways. One implementation method is to calculate the $T_S$ required by the application, as described with regard to Step 76, then arrange components such as a capacitor, a resistor, and/or PCB traces with specified lengths to achieve a time delay. Another implementation may use a calibration scheme on a dedicated dummy net to monitor the current out of the driver. A driver with an optimal $T_S$ value will typically exhibit a zero mA current after the reflection has arrived at the load and the energy in the reflection wavefront has dissipated. Typically, any non-zero current after the reflection has dissipated may be amplified and used as a feedback signal to calibrate $T_S$.

Figure 8:
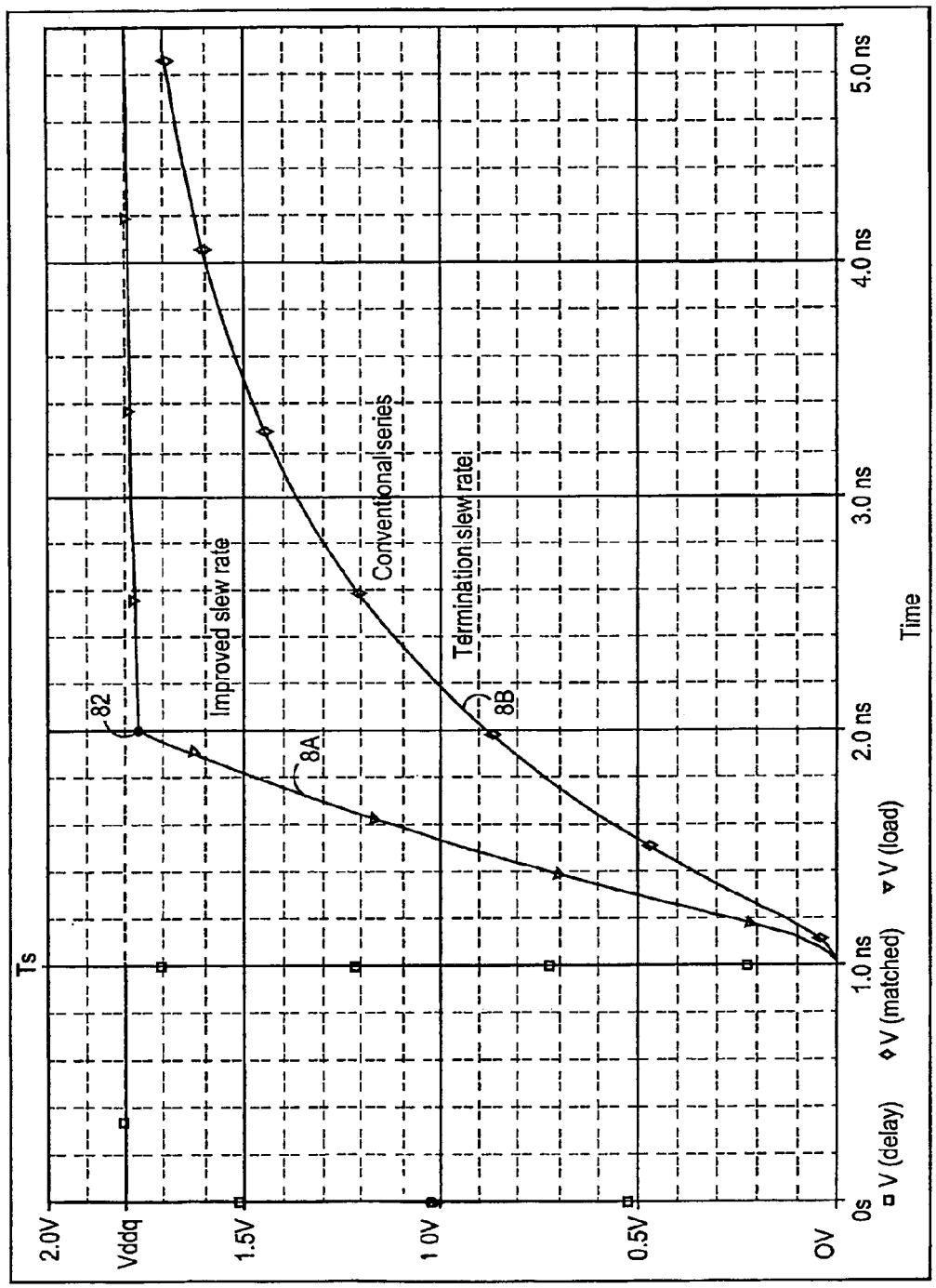
FIG. 8 is graph of a rising load voltage according to one embodiment of the present invention.

FIG. 8 is graph of a rising load voltage wavefrom 8A according to one embodiment of the present invention, configured according to the procedure described with regard to FIG. 7, compared with a conventional series termination driver waveform 8B. The invention may be practiced with advantage to drive a heavy capacitive load through a transmission line with a linear voltage ramp at the load as shown in waveform 8A, until the load substantially reaches the desired voltage rail Vddq, and then an abrupt slow-down in the voltage rise as shown at point 82 on waveform 8A. The change of series termination impedance at time $T_S$ typically causes the current from the driver to be halved. This halving, after a $T_{TRAN}$ delay of 1 nS in this exemplar, typically causes the load voltage curve to abruptly flatten, producing a "sharp voltage corner" at the load with minimal overshoot or undershoot, as shown at point 82. In a preferred embodiment, the driver impedance is close to zero ohms. If $T_{TRAN}$ is short relative to the sum of loaded rise time $T_{LOAD}$ and unloaded rise time $T_{RISE}$, the load slew rate curve may have noticeable change as one or more reflections travel on the un-terminated transmission line before time $T_S$. In such a case, time $T_S$ may be set to be less than $2*T_{TRAN}$, and a constant-current driver may be used to advantage to drive energy to finish charging load capacitance through series termination 14.

Those of skill in the art will realize, after appreciating this specification, that the improved slew rate and voltage margin characteristics described with regard to FIG. 8 may be employed to advantage by lowering the range of HIGH and LOW voltage signals from the typical full voltage range of zero volts to Vddq. This may be achieved by, for example, driving the load between Vddq*¼ as a LOW signal and Vddq*¾ as a HIGH signal. In this exemplar, the driver may achieve a transition to HIGH by signaling at Vddq, and then at time $T_S$ signaling at Vddq*¾ with series termination 14 in place. Time $T_S$, in this exemplar embodiment, would be determined according to the procedure described with regard to above-referenced FIG. 7, using, however, a desired rise time at the load in Step 74 adjusted to account for the shorter rise time and smaller load charging energy needed to reach Vddq*¾. Further, in this exemplar, the driver may achieve a transition to LOW by signaling at ground, and then at time $T_S$ switching to signal at Vddq*¼ with series termination 14 in place. This exemplar embodiment of the invention may be practiced to advantage to lower transition time between signal levels and reduce power consumption. Further, as those of skill in the art will realize after appreciating this specification, the invention may be employed to advantage in a signaling scheme with multiple signal levels to improve the voltage margin and slew rate of signal transitions.

Although the present invention has been described in detail, it will be apparent to those skilled in the art that the invention may be embodied in a variety of specific forms and that various changes, substitutions and alterations can be made without departing from the spirit and scope of the invention. The described embodiments are only illustrative and not restrictive and the scope of the invention is, therefore, indicated by the following claims.

I claim:

1. A transmission line driving circuit comprising:
   (a) a driver having an output;
   (b) a transmission line having a proximal end and at least one distal end, the transmission line having an impedance;
   (c) a series termination having a first terminal and a second terminal, the first terminal being connected to the driver output and the second terminal being connected to the transmission line proximal end; and
   (d) a switch connected in parallel to the series termination, the switch operable when activated to change between a first, closed mode in which it operates as a substantially shorted circuit and a second, open mode in which it operates as a substantially open circuit.

2. The transmission line driving circuit of claim 1 wherein the driver output is operably connected to a switch control terminal such that a rising-edged signal on the driver output will cause the switch to change to the second, open mode after a switching delay time no greater than twice the time needed for a signal to move from the proximal end of the transmission line to the at least one distal end of the transmission line.

3. The transmission line driving circuit of claim 2 wherein the switching delay time is within plus or minus 20 percent of half of a rise time of the rising-edged signal on the transmission line driving circuit with an at least one load connected to the at least one distal end of the transmission line.

4. The transmission line driving circuit of claim 2 wherein the transmission line driving circuit is configured such that the switching delay time substantially satisfies the expression:

$$\frac{\Pi}{e} SquareRoot(((RC)^\wedge 2 + T_{RISE}^\wedge 2)/2),$$

where RC is a resistive-capacitive time constant of the transmission line driving circuit with the switch in the first closed mode, and at least one load is attached to the at least one distal end of the transmission line, and where $T_{RISE}$ is the rise time of the rising-edged signal on the driver output.

5. The transmission line driving circuit of claim 1 wherein the driver output is operably connected to a switch control terminal such that a falling-edged signal on the driver output will cause the circuit to change to the first, closed mode before the switch changes to the second, open mode.

6. The transmission line driving circuit of claim 1 further comprising at least one receiver connected to the at least one distal end of the transmission line.

7. The transmission line driving circuit of claim 1 wherein the series termination has an impedance that is substantially matched to the transmission line impedance.

8. The transmission line driving circuit of claim 1 wherein the series termination is a resistor.

9. The transmission line driving circuit of claim 1 wherein the switch is a FET switch.

10. The transmission line driving circuit of claim 1 wherein the transmission line comprises a printed circuit board trace.

11. The transmission line driving circuit of claim 1 wherein the switch is activated by a binary signal.

12. A method of controlling a transmission line reflection comprising the steps of:
   (a) producing a short circuit across a first and second terminal of a source termination connected to a proximal end of a transmission line;
   (b) employing a signal driver to apply a transitioning signal through the short circuit to the proximal end of the transmission line; and
   (c) after applying the transitioning signal and before a signal reflection arrives from an at least one distal end of the transmission line, opening the short circuit.

13. The method of claim 12 further comprising the step of pausing for a time delay before opening the short circuit.

14. The method of claim 13 wherein the time delay is approximately one-half of an effective transition time of the transitioning signal in a circuit containing the driver, the transmission line, and an at least one load connected to the at least one distal end of the transmission line.

15. The method of claim 13 wherein the time delay substantially satisfies the expression:

$$\frac{\Pi}{e} SquareRoot(((RC)^\wedge 2 + T_{RISE}{}^\wedge 2)/2),$$

wherein RC is a resistive-capacitive time constant of the transmission line driving circuit, including at least one load attached to the distal end of the transmission line, RC being determined with short circuit existing across the series termination, and wherein $T_{RISE}$ is a transition time of the transitioning signal as applied to the proximal end of the transmission line.

16. The method of claim 13 wherein the step of pausing for a time delay is accomplished by opening the short circuit with a switch having a known switching delay time.

17. The method of claim 12 wherein the step of producing a short circuit comprises closing a switch connected across the first and second terminals of the series termination.

18. The method of claim 12 wherein the step of opening the short circuit comprises opening a switch connected across the first and second terminals of the series termination.

19. The method of claim 18 wherein step of opening the short circuit is accomplished by applying the transitioning signal to a control terminal of the switch.

20. The method of claim 18 wherein the step of opening the short circuit is accomplished by applying a driver input signal to a control terminal of the switch.

21. The method of claim 12 wherein the step of producing the short circuit is accomplished by applying a falling-edged signal to the control terminal of the switch.

22. An adapting source termination circuit comprising:
(a) a control terminal;
(b) an input terminal;
(c) an output terminal;
(d) a transmission line having a proximal end, at least one distal end, and an impedance, the proximal end being connected to the output terminal; and
(e) wherein the adapting source termination circuit is operable to change a termination impedance, as measured between the input terminal and the output terminal, from a zero or near zero impedance to an impedance substantially matching the transmission line impedance after a transitioning signal is applied to the input terminal and before a signal reflection arrives from the at least one distal end of the transmission line.

23. The adapting source termination circuit of claim 22 further comprising:
(a) a resistor connected between the input terminal and the output terminal, the resistor having an impedance substantially matching the impedance of the transmission line; and
(b) a switch connected in parallel with the resistor, the switch having a switch control terminal, the switch control terminal being connected to the adapting source termination circuit control terminal.

24. The adapting source termination circuit of claim 22 further comprising:
(a) a FET connected between the input terminal and the output terminal;

(b) a circuit adapted to apply a varying voltage on the gate of the FET in response to a signal on the control terminal to vary the drain-to-source resistance of the FET.

25. The adapting source termination circuit of claim 22 wherein the control terminal is adapted to receive binary signals, the binary signals operable to cause the change in impedance.

26. The adapting source termination circuit of claim 22 wherein the input terminal is connected to an output of a driver.

27. The adapting source termination circuit of claim 26 wherein the driver has an output impedance of less than 2.5 ohms.

28. The adapting source termination circuit of claim 22 wherein the control terminal is connected to an output of a driver.

29. The adapting source termination circuit of claim 22 wherein the control terminal is connected to an input of a driver.

30. The adapting source termination circuit of claim 22 wherein the change of termination impedance occurs after a delay time of approximately half of an effective transition time of the transmission line.

31. The adapting source termination circuit of claim 22 wherein the change of termination impedance occurs after a delay time chosen to substantially satisfy the expression:

$$\frac{\Pi}{e} SquareRoot(((RC)^\wedge 2 + T_{RISE}{}^\wedge 2)/2)$$

wherein RC is the resistive-capacitive time constant of the adapting source termination circuit with the zero or near zero impedance, including an at least one load attached to the at least one distal end of the transmission line, and wherein $T_{RISE}$ is the transition time of the transitioning signal as applied to the input terminal.

32. A method of controlling a transmission line reflection comprising the steps of:
(a) driving a transmission line with a transitioning signal through a circuit with an impedance that is substantially zero;
(b) after substantially driving the transmission line and before a signal reflection arrives from a distal end of the transmission line, changing the impedance of the circuit from a substantially zero impedance to an impedance that substantially matches an impedance of the transmission line.

33. The method of claim 32 further including the step of pausing for a time delay before changing the impedance.

34. The method of claim 33 wherein the time delay is approximately one-half of an effective transition time of the transmission line.

35. The method of claim 33 wherein the time delay substantially matches the expression:

$$\frac{\Pi}{e} SquareRoot(((RC)^\wedge 2 + T_{RISE}{}^\wedge 2)/2),$$

wherein RC is a resistive-capacitive time constant of a circuit including the transmission line, a driver, and at least one load attached to the distal end of the transmission line, RC being calculated using the substantially zero impedance, and wherein T$_{RISE}$ is a transition time of the transitioning signal as applied to the transmission line.

36. A reflection control driver comprising:
(a) a driver having a driver output;
(b) a controllable series termination having a first terminal, a second terminal, and a control terminal, the first terminal being connected to the driver output, the controllable series termination being configured to present a first short-circuit impedance between the first terminal and the second terminal in response to a first control signal being applied on the control terminal, the controllable series termination being configured to present a second impedance between the first terminal and the second terminal in response to a second control signal on the control terminal.

37. The reflection control driver of claim 36 wherein the driver output is connected to the control terminal.

38. The reflection control driver of claim 36 further comprising a driver input terminal on the driver, the driver input terminal being connected to the control terminal.

39. The reflection control driver of claim 36 wherein the controllable series termination is configured to present the second impedance in response to the second input signal after a time delay.

40. The reflection control driver of claim 39 wherein the time delay is at least a substantial portion of a transition time of a transitioning signal applied on the driver output.

41. The method of claim 39 wherein the time delay is approximately one-half of an effective transition time of the transitioning signal in a circuit containing the reflection control driver, a transmission line, and at least one load connected to an at least one distal end of the transmission line.

42. The method of claim 39 wherein the time delay substantially matches the expression:

$$\frac{\Pi}{e} SquareRoot(((RC)\wedge 2 + T_{RISE}\wedge 2)/2),$$

wherein RC is the resistive-capacitive time constant of a circuit including the reflection control driver attached to a proximal end of a transmission line and at least one load attached to a distal end of the transmission line, RC being determined using the first short-circuit impedance, and wherein T$_{RISE}$ is the transition time of the transitioning signal applied on the driver output.

43. The reflection control driver of claim 36 wherein the controllable series termination further comprises:
(a) a resistor connected between the first and second terminals;
(b) a switch connected between the first and second terminals, the switch being operably connected to the control terminal.

44. The reflection control driver of claim 43 wherein the switch is a FET.

45. The reflection control driver of claim 36 further comprising a variable resistor connected between the first and second terminals and operatively connected to the control terminal.

46. A method of configuring a transmission line circuit comprising the steps of:
(a) finding an unloaded rise time of a driver;
(b) finding an expected total load capacitance C$_{LOAD}$ on a transmission line;
(c) finding a desired rise time T$_{LOAD}$ at a load;
(d) setting an impedance Z of the transmission line to substantially satisfy the expression Z=sqrt(2)*T$_{LOAD}$/C$_{LOAD}$ if the result of the expression is higher than a lowest practical Z value;
(e) setting the impedance Z of the transmission line to the lowest practical Z value if the result of expression Z=sqrt(2)*T$_{LOAD}$/C$_{LOAD}$ is lower than the lowest practical Z value;
(f) setting a series termination switching time T$_S$ such that the driver transmits substantially all of a charge needed to charge C$_{LOAD}$ onto the transmission line through a short circuit before time T$_S$.

47. The method of claim 46, further including the step of setting a constant current driver to a current needed to drive substantially all of a charge needed to charge C$_{LOAD}$ before time T$_S$.

48. A method of calibrating a circuit comprising the steps of:
(a) measuring a current out of a driver after a first reflection from a distal end of a transmission line has been dissipated;
(b) increasing a series termination switching time T$_S$ if the current is non-zero.

* * * * *